July 12, 1938.   R. R. MEAD   2,123,822
SLUG CASTING MACHINE
Filed Sept. 30, 1936   2 Sheets-Sheet 2
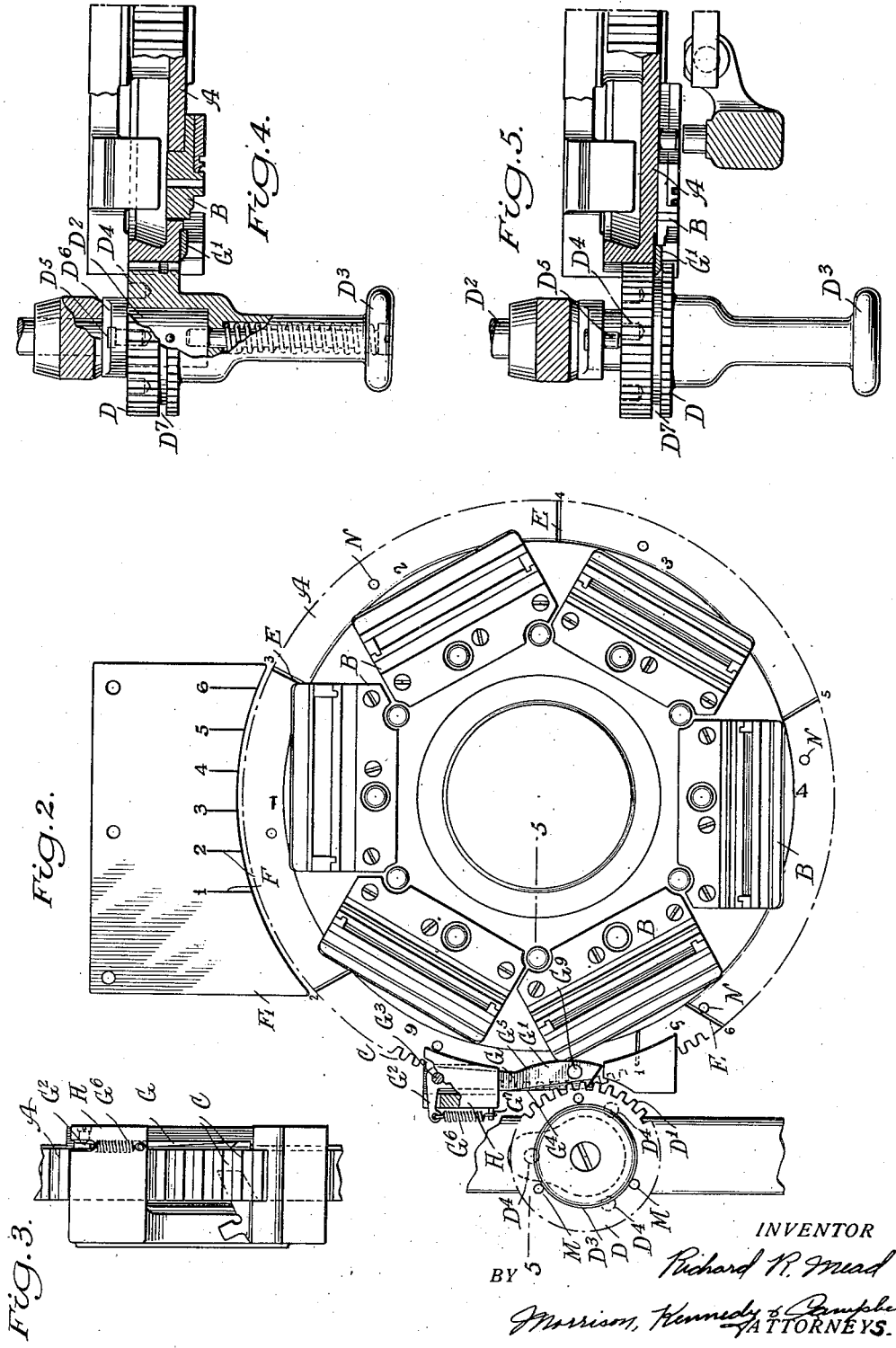

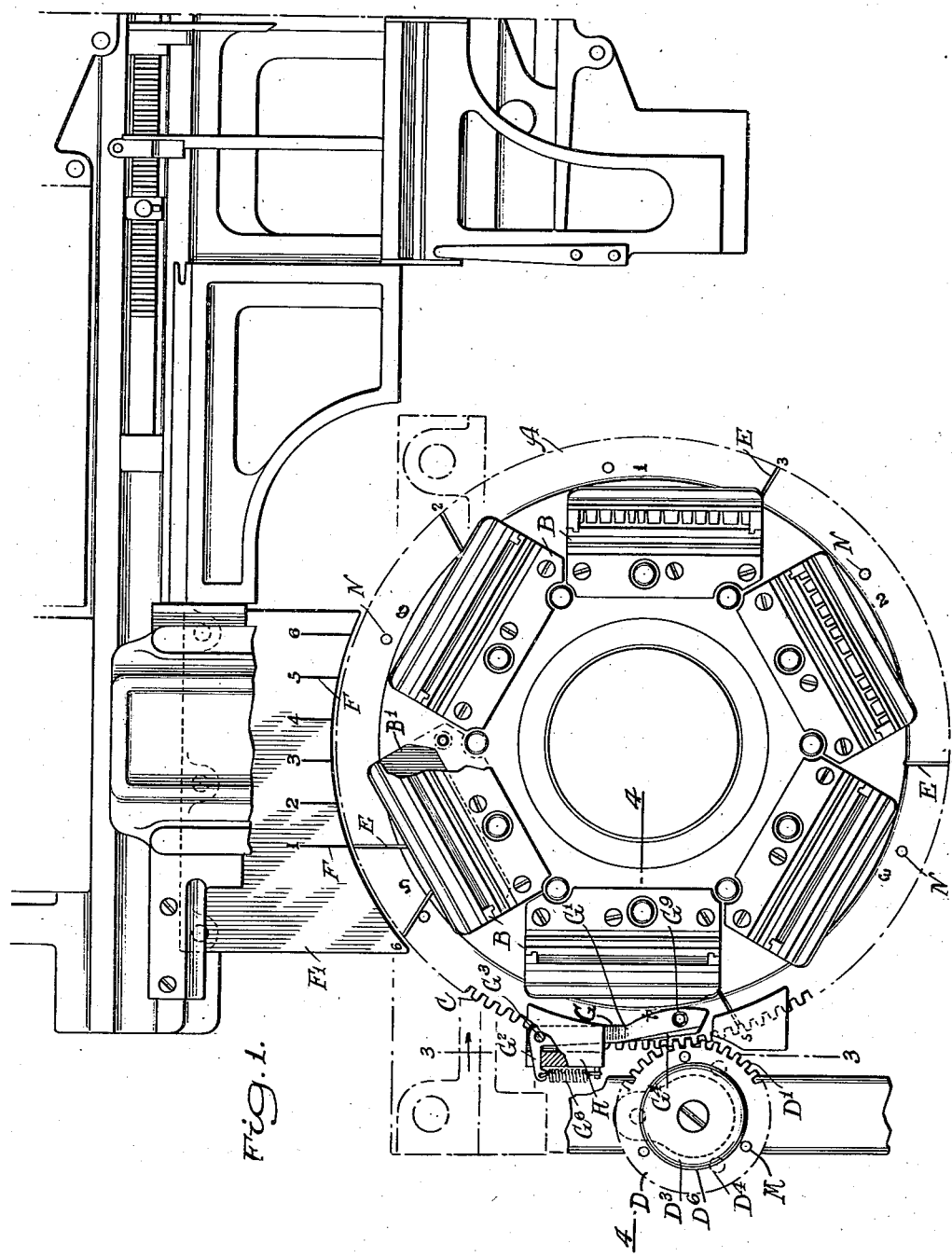

Patented July 12, 1938

2,123,822

UNITED STATES PATENT OFFICE 2,123,822

SLUG CASTING MACHINE

Richard R. Mead, Queens Village, N. Y., assignor to Mergenthaler Linotype Company, a corporation of New York Application September 30, 1936, Serial No. 103,304

11 Claims. (Cl. 199—48)

This invention relates to slug casting machines of the general organization represented in United States Letters Patent No. 436,532 to O. Mergenthaler, wherein circulating matrices are released from a magazine in the order in which their characters are to appear in print and then assembled in line, the composed line transferred to the face of a slotted mold carried by a rotatable mold disc, the mold filled with molten metal to form a slug or Linotype against the matrices which produce the type characters thereon, and the matrices thereafter returned through a distributing mechanism to the magazine from which they started.

In these machines, the mold disc is rotated by a driving pinion meshing with gear teeth on the periphery of the disc and mounted on a driving shaft operated from the main shaft of the machine. This driving pinion is slidable axially on the driving shaft so as to make and break the driving connection, and when the driving connection is broken, the driving pinion is free to be rotated manually on the driving shaft to adjust the mold disc for locating any selected one of the molds which it carries in operative position. Ordinarily, the mold disc carries but four molds, which are disposed in symmetrical or square formation about its axis, and since the ratio of the gear teeth on the mold disc and those of the driving pinion is four to one, one complete rotation of the pinion will impart a one-quarter rotation to the mold disc, which is sufficient to effect a change from one mold to the next on the disc. Consequently, in providing for the making and breaking of the driving connection, the driving pinion is formed with a single recess which, by the axial shifting of the pinion on the shaft, can be engaged with or disengaged from a coupling pin fixed to the shaft.

In some machines, however, the mold disc is required to carry six molds disposed in symmetrical or hexagonal formation about the axis of the disc and hence in changing from one mold to the next the disc is given only a one-sixth rotation, which means that the driving pinion in making the adjustment is given a two-thirds rotation (rather than a full rotation as ordinarily). In providing for such partial rotation of the driving pinion, the latter is formed with three coupling recesses (instead of one), these recesses being disposed 120° apart, or at a distance equivalent to a one-third rotation of the pinion. Due to the use of the three coupling recesses, it becomes possible for the operator to couple the pinion to the driving shaft without rotating the mold disc sufficiently to locate the mold intended to be selected in operative position. Thus, as before stated, in changing from one mold to the next, the mold disc must be given a one-sixth rotation by a two-thirds rotation of the pinion, and yet the coupling recesses of the pinion are so disposed that the pinion may be coupled to the shaft by giving it only a one-third rotation. Of course the same condition arises in changing from any mold to another, the only difference being that the driving pinion must be given a multiple of a two-thirds rotation whenever the substitute mold is not disposed next (before or after) the mold to be replaced. Because of this condition, it frequently happens that the operator through carelessness or oversight will connect the driving pinion with the driving shaft at a time when the mold intended to be selected is not located in operative position, and when this occurs, damage to the parts or a bad "squirt" is almost bound to result.

The present invention is intended to obviate the foregoing and other difficulties and contemplates an automatic safety device which will prevent the coupling of the driving pinion to the driving shaft whenever the mold disc is given an adjustment which fails to locate one of the molds in operative position. In the embodiment illustrated, the automatic safety latch is in the form of a spring tensioned latch pivotally mounted on the stationary mold disc guiding bracket and adapted to be rocked by the molds to engage in an annular groove formed in the periphery of the driving pinion as the mold disc is rotatably adjusted in the selection of a mold; the latch engaging the annular groove when there is no mold in operative position, and being free to be disengaged from the groove by the pull of the spring when a mold is in operative position.

The invention further provides means to indicate that a mold is in operative position and that the pinion is accurately located in the proper angular position for reengagement with the driving pin.

In the accompanying drawings, the invention has been shown merely by way of example and in preferred form, and obviously many variations and modifications may be made therein which will still be comprised within its spirit. It is to be understood, therefore, that the invention is not limited to any specific form or embodiment except insofar as such limitations are specified in the appended claims.

Referring to the drawings:

Fig. 1 is a front elevation of a portion of a slug casting machine with the improvements embodied therein, some of the parts being broken away to show the construction;

Fig. 2 is a front elevation, partly broken away, of some of the parts shown in Fig. 1, but showing them in a different position;

Fig. 3 is a fragmentary side elevation, looking in the direction of the arrows from the line 3—3 of Fig. 1;

Fig. 4 is a top plan view, partly broken away and partly in section along the line 4—4 of Fig. 1; and Fig. 5 is a view similar to Fig. 4, taken along the line 5—5 of Fig. 2.

The rotatable mold disc A is equipped with six molds B hexagonally disposed about its axis and whose front or casting faces stand out beyond the front face of the disc as indicated by the broken away portion $B^1$ of the mold 5 in Fig. 1. On its periphery, the disc A is formed with the gear teeth C which mesh with the teeth $D^1$ of the driving pinion D by which the disc is rotated for both machine control thereof and manual adjustment to select a mold.

As best shown in Figs. 4 and 5, the pinion D is slidable axially on the driving shaft $D^2$ to make and break the driving connection with the mold disc, being freely rotatable by the knob $D^3$ when the driving connection is broken to adjust the mold disc manually for locating any selected one of the molds in operative position. The driving pinion is formed with three recesses $D^4$ adapted to accommodate the driving pin $D^5$ projecting from the collar $D^6$ fixed to the driving shaft $D^2$ and through which the machine control of the mold disc A is effected, the recesses $D^4$ being angularly disposed 120° apart in the inner face of the pinion D and one or the other being adapted to receive the driving pin $D^5$ depending upon the particular mold selected. To aid in the selection of the molds, the disc A is provided on its front face with the alining marks E which are arranged to register with the marks F on the adjacent lower edge of the plate $F^1$ depending from the machine frame above the disc, there being a mark in each instance for each mold. In order to facilitate the description, the molds B and their respective marks E and F are indicated by corresponding numerals from 1 to 6.

Coming now to the present invention, a latch G in the form of a bell-crank lever having long and short arms $G^1$ and $G^2$, respectively, is pivotally mounted as at $G^3$ to the fixed mold disc guide H so that its long arm $G^1$ depends in front of the mold disc A slightly below the point where the pinion teeth D mesh with the gear teeth C on the disc, its straight edge $G^4$ adjacent the pinion being beveled and its opposite edge $G^5$ rounded to provide a cam surface adapted to be engaged by the projecting molds B. A tension spring $G^6$ is arranged to maintain the latch G normally in its inactive position, as shown in Fig. 1, the spring having one end anchored to a pin $G^7$ projecting from the guide H and the opposite end attached to the distal end of the short arm $G^2$ of the latch.

The pinion D is formed in its periphery with an annular groove $D^7$ which is located to be brought into position to receive the beveled edge $G^4$ of the latch G when the pinion is pulled forwardly to disengage it from the driving pin $D^5$ for manual rotation of the disc A (see Fig. 5). When the pinion D occupies its rearward position, engaged with the pin $D^5$ for machine control of the mold disc A (see Fig. 4), its front face lies rearwardly of the path of movement of the latch G and the latter is merely rocked idly by the molds as the disc is rotated during the slug casting operation.

Figs. 1 and 2 illustrate the mold disc A in different angular positions to show the condition of the parts when a mold B is in operative position (Fig. 1) and when no mold is in operative position (Fig. 2). Because of the hexagonal disposition of the molds B, each mold is located on the disc diametrically opposite another mold, so that when a selected mold occupies its vertical operative position the opposite mold also occupies a vertical position (see molds 1 and 4, Fig. 1), with the result that the latch G is held in its normal inactive position by the spring $G^6$. On the other hand, when no mold is in operative position, one of the molds adjacent the latch will occupy an inclined or non-vertical position (see mold 5, Fig. 2) and hold the latch G against the pull of the spring $G^6$ in the groove $D^7$ to prevent the rearward movement of the pinion for reengagement with the pin $D^5$. In short, machine control of the mold disc A can only be established when there is a mold in operative position.

While the molds B are herein utilized for actuating the latch G, the same result may be obtained by providing other means, such as pins or lugs on the disc, to engage the latch at the proper times as the disc is rotated for manual adjustment.

An added feature of the invention resides in the provision of markings M and N on the pinion D and mold disc A, respectively, which indicate both that a mold is in operative position and that the pinion is accurately located in the proper angular position for reengagement with the driving pin $D^5$. The long arm $G^1$ of the latch G is formed with an aperture $G^9$ which, when the latch occupies its normal position, is located so that the markings N for the different molds register therewith when the respective mold is in operative position. The reason for this arrangement is that the latch G is not continuously engaged with the pinion D during a one-sixth rotation of the mold disc A but is returned by the spring $G^6$ to its normal position when the following end of the mold which previously occupied a vertical position is carried out of engagement with the latch and before the leading end of the next mold has moved into engagement with the latch and again rocked the latter into engagement with the pinion. During this interval when the latch G returns to its normal position, machine control of the disc A cannot be reestablished because there is no recess $D^4$ in alinement with the driving pin $D^5$, and to effect their alinement would require rotation of the pinion and consequently rotation of the disc A which would either bring a mold into operative position or effect the reengagement of the latch G with the pinion. When, however, the latch G is in its normal position and one of the markings N registers with the opening $G^9$, indicating that a mold is in operative position, it also alines horizontally with a marking M on the pinion and indicates that a recess $D^4$ and the driving pin $D^5$ are accurately alined for reengagement of the pinion with the pin and thereby obviates the necessity of effecting their alinement by a trial and error rotation of the pinion in opposite directions.

Having thus described my invention, what I claim is:

1. In a slug casting machine, the combination of a rotatable mold disc equipped with a plurality of molds, driving means therefor including a shiftable element to make and break the driving connection, said mold disc being adjustable manually when the driving connection is broken to locate any selected one of the molds in operative position, and an automatic safety device forming no part of the driving connection and cooperating with but distinct from the shiftable element and serving to prevent the making of the driving connection whenever the manual adjustment of the mold disc is such that no mold is located in operative position.

2. A combination according to claim 1, characterized by the fact that the safety device is controlled in its automatic operation by the manual adjustment of the mold disc.

3. A combination according to claim 1, characterized by the fact that the safety device is normally inactive and is rendered active by one or another of the molds on the mold disc during the manual adjustment of the disc.

4. In a slug casting machine, the combination of a rotatable mold disc equipped with a plurality of molds, a driving pinion meshing with gear teeth on the mold disc, a driving shaft on which the pinion is mounted, said pinion being shiftable axially on the driving shaft to make and break the driving connection and rotatable freely on the shaft when the driving connection is broken to adjust the mold disc manually for locating any selected one of the molds in operative position, and an automatic safety device forming no part of the driving connection and cooperating with but distinct from the shiftable pinion and serving to prevent the making of the driving connection whenever the manual adjustment of the mold disc is such that no mold is located in operative position.

5. In a slug casting machine, the combination of a rotatable mold disc formed with gear teeth on its periphery and equipped with six molds disposed symmetrically about the axis of the disc, a driving pinion meshing with the gear teeth on the mold disc and formed with three recesses symmetrically disposed about the axis of the pinion, a driving shaft on which the pinion is mounted and having a fixed coupling pin normally engaged in one of the three recesses of the pinion, said pinion being slidable axially on the shaft to disengage it from the coupling pin and when so disengaged being freely rotatable on the shaft to adjust the mold disc for locating any selected one of the molds in operative position, and an automatic safety latch cooperating with the driving pinion when disengaged from the coupling pin on the driving shaft and serving to prevent it from being reengaged with said coupling pin in the event of an improper adjustment of the mold disc.

6. In a slug casting machine, the combination of a rotatable mold disc formed with gear teeth on its periphery and equipped with six molds disposed symmetrically about the axis of the disc, a driving pinion meshing with the gear teeth on the mold disc and formed with three recesses symmetrically disposed about the axis of the pinion, a driving shaft on which the pinion is mounted and having a fixed coupling pin normally engaged in one of the three recesses of the pinion, said pinion being slidable axially on the shaft to disengage it from the coupling pin and when so disengaged being freely rotatable on the shaft to adjust the mold disc for locating any selected one of the molds in operative position, and an automatic safety latch supported by a fixed part of the machine and adapted in the disengaged position of the driving pinion to enter a peripheral groove formed therein, said latch being held out of the pinion groove whenever the adjustment of the mold disc is such as to locate one of the molds in operative position and being held in the pinion groove whenever the adjustment of the mold disc is such as to locate no mold in operative position.

7. In a slug casting machine, the combination of a rotatable mold disc formed with gear teeth on its periphery and equipped with six molds disposed symmetrically about the axis of the disc, a driving pinion meshing with the gear teeth on the mold disc and formed with three recesses symmetrically disposed about the axis of the pinion, a driving shaft on which the pinion is mounted and having a fixed coupling pin normally engaged in one of the three recesses of the pinion, said pinion being slidable axially on the shaft to disengage it from the coupling pin and when so disengaged being freely rotatable on the shaft to adjust the mold disc for locating any selected one of the molds in operative position, a safety latch supported by a fixed part of the machine and adapted in the disengaged position of the driving pinion to enter a peripheral groove formed therein, and a spring tending constantly to hold the safety latch out of the pinion groove, said safety latch being actuated during the manual adjustment of the mold disc and caused to enter the pinion groove whenever the adjustment of the disc is such that no mold is located in operative position.

8. In a slug casting machine, the combination of a rotatable mold disc formed with gear teeth on its periphery and equipped with six molds disposed symmetrically about the axis of the disc, a driving pinion meshing with the gear teeth on the mold disc and formed with three recesses symmetrically disposed about the axis of the pinion, a driving shaft on which the pinion is mounted and having a fixed coupling pin normally engaged in one of the three recesses of the pinion, said pinion being slidable axially on the shaft to disengage it from the coupling pin and when so disengaged being freely rotatable on the shaft to adjust the mold disc for locating any selected one of the molds in operative position, a safety latch supported by a fixed part of the machine and adapted in the disengaged position of the driving pinion to enter a peripheral groove formed therein, and a spring tending constantly to hold the safety latch out of the pinion groove, said safety latch being arranged to be actuated by one or another of the molds during the manual adjustment of the mold disc and caused to enter the pinion groove whenever the adjustment of the disc is such that no mold is located in operative position.

9. A combination according to claim 4, characterized by the fact that the mold disc and the driving pinion are provided with indicating marks arranged to be brought into registration selectively during the manual adjustment of the mold disc to guide the operator in selecting the desired mold.

10. A combination according to claim 5, wherein the mold disc is provided on its front face with six indicating marks, one for each mold, disposed symmetrically about the axis of the disc, and wherein the driving pinion is provided on its front face with three indicating marks, one for each of the three coupling recesses, disposed symmetrically about the axis of the pinion, these indicating marks being so arranged that whenever a selected mold is brought into operative position the corresponding mark on the mold disc will aline with one of the marks on the driving pinion.

11. A combination according to claim 5, wherein the mold disc is provided on its front face with six indicating marks, one for each mold, disposed symmetrically about the axis of the disc, and wherein the driving pinion is provided on its front face with three indicating marks, one for each of the three coupling recesses, disposed symmetrically about the axis of the pinion, these indicating marks being so arranged that whenever a selected mold is brought into operative position the corresponding mark on the mold disc will aline with one of the marks on the driving pinion, characterized in that the automatic latch is formed with a peep hole through which the indicating mark on the mold disc may be seen when it is brought into alinement with the mark on the driving pinion.

RICHARD R. MEAD.